United States Patent
Fukuda et al.

(10) Patent No.: US 6,873,345 B2
(45) Date of Patent: Mar. 29, 2005

(54) INFORMATION DISPLAY APPARATUS

(75) Inventors: Yoshibumi Fukuda, Hitachi (JP); Yukihiro Kawamata, Hitachi (JP); Kimiya Yamaashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 490 days.

(21) Appl. No.: 09/808,127

(22) Filed: Mar. 15, 2001

(65) Prior Publication Data

US 2001/0010525 A1 Aug. 2, 2001

Related U.S. Application Data

(63) Continuation of application No. 09/065,005, filed on Apr. 23, 1998, now abandoned.

(51) Int. Cl.⁷ ................................................ G09G 5/00
(52) U.S. Cl. ...................... 345/807; 345/788; 345/581; 345/3.3
(58) Field of Search ............................... 345/781, 788, 345/792, 803, 764, 765, 744, 807, 581, 593, 594, 3.3, 3.4

(56) References Cited

U.S. PATENT DOCUMENTS

| | | | |
|---|---|---|---|
| 5,796,403 A | * 8/1998 | Adams et al. | 345/803 |
| 5,980,089 A | * 11/1999 | Weis | 700/213 |
| 6,088,045 A | 7/2000 | Lumelsky et al. | 345/509 |
| 6,232,951 B1 | * 5/2001 | Miyamoto | 345/698 |

FOREIGN PATENT DOCUMENTS

| | | |
|---|---|---|
| JP | 01-263701 | 10/1989 |
| JP | A 2-157909 | 6/1990 |
| JP | A 7-200794 | 8/1995 |
| JP | A 8-275240 | 10/1996 |
| JP | 53-296108 | 12/1998 |

OTHER PUBLICATIONS

Toshiba Review, 1994, vol. 49, No. 2, pp. 116–117.

* cited by examiner

*Primary Examiner*—Ba Huynh
(74) *Attorney, Agent, or Firm*—Kenyon & Kenyon

(57) ABSTRACT

An adaptive information display apparatus is provided for simultaneously displaying a plurality of kinds of display information on a display screen in an optimal display form. The information display apparatus includes a work processing unit for executing a plurality of kinds of work processing based on each of data inputted from a sensor input unit and a character/coordinate input unit and outputting the results of the work processing, and a display unit for displaying the results of the plurality of kinds of work processing outputted from the work processing unit. The information display apparatus further includes a display form detector unit detecting display form data for the display unit, an arrangement rule storage unit storing an arrangement rule defining display forms corresponding to each of the plurality of kinds of work processing, and a display arrangement control unit comparing the display form data and the arrangement rule for each work to output a predetermined display arrangement instruction. The work processing unit outputs the results of each of the plurality of kinds of work processing to the display unit in a predetermined display form in accordance with the display arrangement instruction.

11 Claims, 9 Drawing Sheets

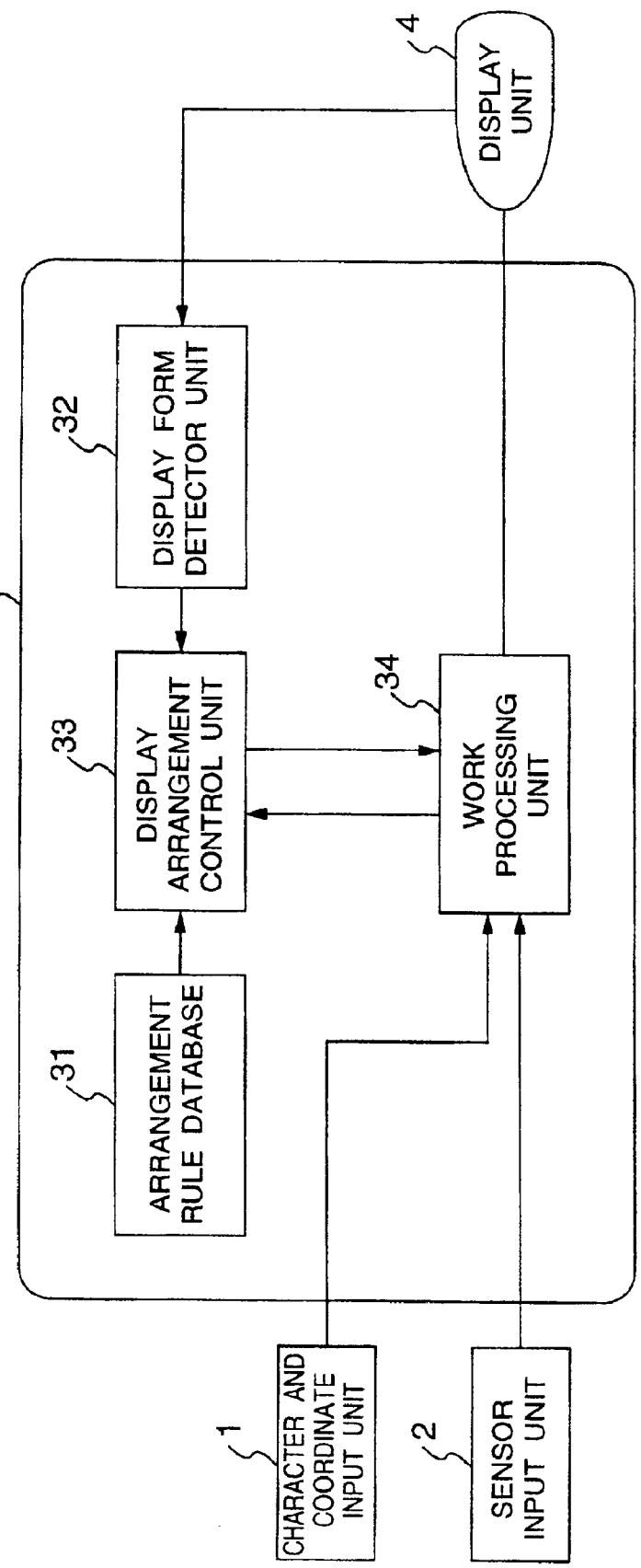

FIG. 3

| ARRANGEMENT RULE n | ~311 |
|---|---|
| NAME OF CORRE-SPONDING WORK | ~312 |
| WORK PRIORITY | ~313 |

| INITIAL VALUE FOR SIZE OF REQUIRED AREA | INITIAL VALUE FOR DISPLAY FORMAT |
|---|---|
| RANGE OF REQUIRED AREA 1 | DISPLAY FORMAT 1 |
| RANGE OF REQUIRED AREA 2 | DISPLAY FORMAT 2 |
| ⋮ | ⋮ |
| RANGE OF REQUIRED AREA m | DISPLAY FORMAT m |

| ARRANGEMENT RULE n | ~311 |
|---|---|
| NAME OF CORRESPONDING WORK | ~312 |
| WORK PRIORITY | ~313 |

| INITIAL VALUE FOR REQUIRED NUMBER OF COLORS | INITIAL VALUE FOR DISPLAY FORMAT |
|---|---|
| RANGE OF REQUIRED NUMBER OF COLORS 1 | DISPLAY FORMAT 1 |
| RANGE OF REQUIRED NUMBER OF COLORS 2 | DISPLAY FORMAT 2 |
| ⋮ | ⋮ |
| RANGE OF REQUIRED NUMBER OF COLORS m | DISPLAY FORMAT m |

| ARRANGEMENT RULE n | ~311 |
|---|---|
| NAME OF CORRESPONDING WORK | ~312 |
| WORK PRIORITY | ~313 |

| INITIAL VALUE FOR REQUIRED DRAWING SPEED | INITIAL VALUE FOR DISPLAY FORMAT |
|---|---|
| RANGE OF REQUIRED DRAWING SPEED 1 | DISPLAY FORMAT 1 |
| RANGE OF REQUIRED DRAWING SPEED 2 | DISPLAY FORMAT 2 |
| ⋮ | ⋮ |
| RANGE OF REQUIRED DRAWING SPEED m | DISPLAY FORMAT m |

| ARRANGEMENT RULE n ~311 | | | | |
|---|---|---|---|---|
| NAME OF CORRE-SPONDING WORK ~312 | | | | |
| WORK PRIORITY ~313 | | 321 | | |
| | INITIAL VALUE FOR REQUIRED DRAWING SPEED | RANGE OF REQUIRED DRAWING SPEED 1 | ... | RANGE OF REQUIRED DRAWING SPEED p |
| INITIAL VALUE FOR SIZE OF REQUIRED AREA | INITIAL VALUE FOR DISPLAY FORMAT | DISPLAY FORMAT 0-1 | ... | DISPLAY FORMAT 0-p |
| RANGE OF REQUIRED AREA 1 | DISPLAY FORMAT 1-0 | DISPLAY FORMAT 1-1 | | |
| RANGE OF REQUIRED AREA 2 | DISPLAY FORMAT 2-0 | | | |
| ⋮ | ⋮ | | | ⋮ |
| RANGE OF REQUIRED AREA m | DISPLAY FORMAT m-0 | | ... | DISPLAY FORMAT m-p |

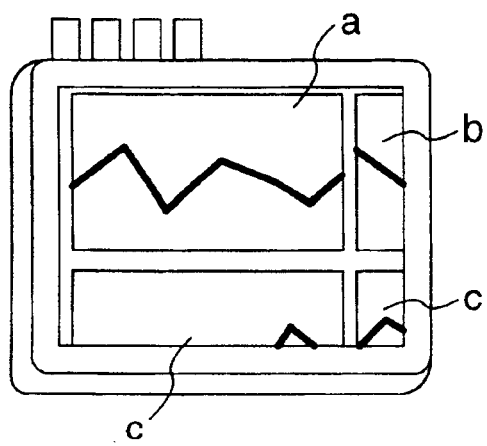

INFORMATION DISPLAY APPARATUS

This is a continuation of application Ser. No. 09/065,005, filed 23 Apr. 1998, abandoned.

BACKGROUND OF THE INVENTION

The present invention relates generally to an adaptive information display apparatus, and more particularly to an adaptive information display apparatus which is capable of simultaneously displaying a plurality of kinds of display information on a display screen in an optimal display form.

Conventionally, there has been known an information display apparatus which is responsive to an information display instruction by a user to ensure particular areas in a coordinate domain defined on a display screen to display information in the form of graph, numerical values, text and so on. However, information displayed in such areas is typically independent of each other, and the sizes and positions of respective display areas are fixed. In addition, even if display capabilities are changed to provide a different resolution, a different number of colors, and so on, the sizes and positions of display areas remain fixed. It should be noted that some known information display apparatus employing a multi-window scheme can change the sizes and positions of display areas when instructed by the user.

As a conventional information display apparatus, Toshiba Review 1994, Vol. 1.49, No. 2, pp 116–117 discloses a field operation support system in a thermal power plant which displays information such as a systematic diagram, trend graphs and the like on a handy terminal unit.

Also, JP-A-63-296108 discloses, as a related technique, a method of displaying process data and operation guidance for a plant on a screen when a plant monitoring operation is performed.

Further, JP-A-1-263701 discloses, as another related technique, a method of changing a display format for plant monitoring information on an entire screen in response to a request from the user.

SUMMARY OF THE INVENTION

In the above-mentioned conventional information display apparatus, however, the display areas each have a fixed size, position and number of colors, so that if an identical working program is used to process and output information to be displayed in order to display the information on a plurality of information display apparatus having different specifications for their respective output display units, some apparatus may display only display information a with display information b–c being lost; some apparatus may display information in different colors; and other apparatus may not fetch all information to be displayed, for example, as illustrated in FIG. 11. Also, in the conventional information display apparatus, if a plurality of kinds of information are displayed on a single information display apparatus using individual working programs for processing and outputting the plurality of kinds of information to display associated information independently of each other, display areas for their respective display information are likely to overlap so that all information cannot be displayed on the screen. Moreover, if a working program designed for an information display apparatus having high computational capabilities is executed on an information display apparatus having low computational capabilities, it would take too long time to execute computational processing and display information, so that the information display apparatus of lower capabilities could not process all information sequentially inputted thereto and would be susceptible to lose some information.

Further, in recent years, while working programs for processing information to be displayed have been increasingly acquired through networks in much more cases, it is substantially impossible for distributors of such working programs to previously define specifications for a display portion and specifications for a portion associated with computational processing in a particular information display apparatus for executing the working programs, and to provide the working programs corresponding to the specifications of the particular information display apparatus.

To solve the foregoing problems, it is an object of the present invention to provide an adaptive information display apparatus which is capable of dynamically detecting specifications associated with display such as a display resolution, the number of available colors and the like in a display unit of the adaptive information display apparatus, and specifications associated with processing such as the number of works for computational processing to be displayed on the display unit, processing loads in respective works, and so on to change the size, position and display format of each display area in an optimal state.

To solve the problems mentioned above, the present invention employs solving means as follows.

According to one aspect of the present invention, an information display apparatus comprises a sensor input unit inputting sensor data, a character/coordinate input unit inputting characters and coordinates, a work processing unit executing a plurality of kinds of work processing and outputting results of the work processing based on respective data inputted from the sensor input unit and the character/coordinate input unit, and a display unit displaying the results of the plurality of kinds of work processing outputted from the work processing unit, wherein the information display apparatus further comprises a display form detector unit detecting display form data for the display unit, arrangement rule storing means for storing an arrangement rule defining display forms corresponding to each of the plurality of kinds of work processing, and display arrangement control unit comparing display form data detected by the display form detector unit with the arrangement rules stored in the arrangement rule storing means for each work to output a predetermined display arrangement instruction, and the work processing unit outputs the result of each of the plurality of kinds of work processing in a predetermined display form in accordance with the display arrangement instruction.

The display form data detected in the display form detector unit is a display resolution, in which case the arrangement rule stored in the arrangement rule storing means comprises display areas set in accordance with the display resolution and display formats.

The display form data detected in the display form detector unit is the number of display colors, in which case the arrangement rule stored in the arrangement rule storing means comprises the numbers of display colors and display formats.

The display form data detected in the display form detector unit is a drawing speed, in which case the arrangement rule stored in the arrangement rule storing means comprises drawing speeds and display formats.

According to another aspect of the present invention, an information display apparatus comprises a sensor input unit inputting sensor data, a character/coordinate input unit inputting characters and coordinates, a work processing unit executing a plurality of kinds of work processing and outputting results of the work processing based on respective data inputted from the sensor input unit and the character/coordinate input unit, and a display unit displaying the results of the plurality of kinds of work processing outputted from the work processing unit, wherein the information display apparatus further comprises arrangement rule storing means for storing an arrangement rule defining display forms corresponding to each of the plurality of kinds of work processing, and display arrangement control unit comparing work processing data detected by the work processing unit with the arrangement rules stored in the arrangement rule storing means for each work to output a predetermined display arrangement instruction, and the work processing unit outputs the result of each of the plurality of kinds of work processing in a predetermined display form in accordance with the display arrangement instruction.

The work processing data detected in the work processing unit is a computation speed, in which case the arrangement rule stored in the arrangement rule storing means comprises computation speeds and display formats.

The work processing data detected in the work processing unit is the number of works, in which case the arrangement rule stored in the arrangement rule storing means comprises the numbers of works and display formats.

The work processing data detected in the work processing unit is a work load, in which case the arrangement rule stored in the arrangement rule storing means comprises work loads and display formats.

The work processing data detected in the work processing unit is work priority, in which case the arrangement rule stored in the arrangement rule storing means comprises work priority levels and display formats.

Other objects, features and advantages of the present invention will become apparent when reading the following description of the embodiments taken in conjunction with the accompanying drawings.

BRIEF DESCRIPTION OF THE DRAWINGS

FIG. 1 is a block diagram illustrating an adaptive information display apparatus according to each embodiment of the present invention;

FIG. 3 shows an example of an arrangement rule stored in an arrangement rule database according to a first embodiment of the present invention;

FIG. 7 shows an example of an arrangement rule stored in an arrangement rule database according to a third embodiment of the present invention;

FIG. 9 shows an example of an arrangement rule stored in an arrangement rule database according to a fourth embodiment of the present invention;

FIG. 10 shows an example of an arrangement rule stored in an arrangement rule database according to another embodiment of the present invention; and FIG. 11 is a schematic diagram of an information display apparatus according to the prior art.

DETAILED DESCRIPTION OF THE PREFERRED EMBODIMENTS

Figure 2A:
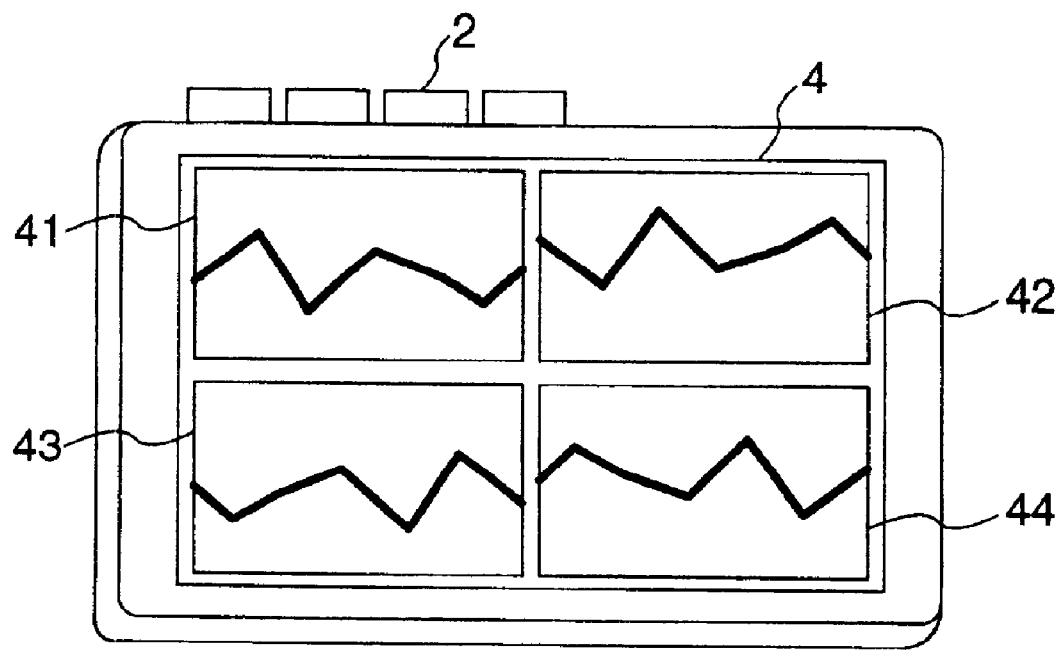
FIGS. 2A and 2B are schematic diagrams of the adaptive information display apparatus illustrated in FIG. 1.

To begin with, a first embodiment of the present invention will be described with reference to FIGS. 1–5.

FIG. 1 is a block diagram illustrating a general configuration of an adaptive information display apparatus according to the first embodiment.

Referring specifically to FIG. 1, the adaptive information display apparatus comprises a character and coordinate input unit 1 including a mouse and a keyboard for specifying and starting computational processing, and for setting coordinates and so on required for calculations; a sensor input unit 2 for receiving sensor data from sensors attached to a variety of systems exhibiting dynamic state transitions such as, for example, plant facilities or the like; a main body 3 of the adaptive information display apparatus for processing a variety of input data to output information to be displayed; an arrangement rule database 31 for storing an arrangement rule which defines the work priority for determining which works should be preferentially processed in a display arrangement control unit, as well as display areas and display formats for displaying processing results on a display unit; a display information detector unit 32 reading a display form including a display resolution, the number of display colors, a drawing speed for display, and so on of the display unit in real time to output the display form to the display arrangement control unit; the display arrangement control unit 33 reading a display form for the display unit detected by the display information detector unit 32, calculating a display area to be displayed on the display unit and a display format based on the arrangement rule read from the arrangement rule database 31, and sending the calculated display area and display format to a work processing unit; the work processing unit 34 performing predetermined work processing specified by an input from the character and coordinate input unit 1 based on sensor data inputted from the sensor input unit 2 to output display information; and the display unit 4 providing display information in a display form controlled by the display arrangement control unit 33.

The arrangement rule database 31 comprises arrangement rules corresponding to a variety of working programs which may be executed in the work processing unit 34.

Figure 2B:
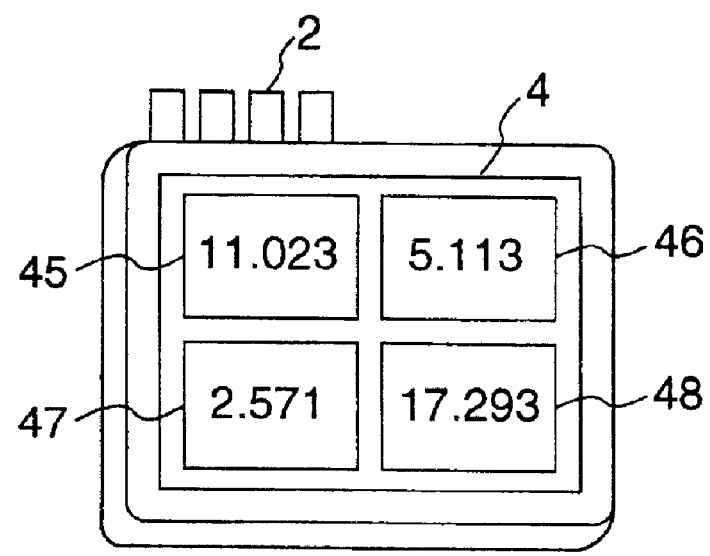

Next, FIGS. 2A and 2B illustrate schematic diagrams of the adaptive information display apparatus according to the first embodiment.

FIG. 2A illustrates display information provided in a trend graph form, while FIG. 2B illustrates display information in a text data form.

In these figures, parts identical to those illustrated in FIG. 1 are designated the same reference numerals, and description thereon is omitted.

In these Figures, display areas 41–44 and 45–58 are provided on the display unit 4 as exemplary display areas for four kinds of display information.

As illustrated, the adaptive information display apparatus is designed to be portable. The display unit 4 includes a liquid crystal display screen on which a touch panel is mounted to allow the user to operate by accessing the touch panel with a pen or a finger. Thus, the display unit 4 also serves as the character and coordinate input unit 1. The sensor input unit 2 receives sensor data from a plurality of types of sensors such as, for example, a noise sensor, a temperature sensor, a gas sensor and so on, not shown, directly or through remote sensing.

By thus configuring the adaptive information display apparatus, a service man dedicated to field operations, for example, in a plant such as a power plant, an iron mill or the like may carry the adaptive information display apparatus to collect sensor data from a plurality of types of sensors through the sensor input unit 2 and to process the sensor data through input manipulations from the liquid crystal display screen having the touch panel, thereby displaying information in the from of trend graphs on the display unit 4 as illustrated in FIG. 2A or displaying information represented by text data on the display unit 4 as illustrated in FIG. 2B, by way of example.

Next, an arrangement rule stored in the arrangement rule database 31 illustrated in FIG. 1 will be described with reference to FIG. 3.

The arrangement rule includes an arrangement rule identifying number 311 assigned to each operation processing executed by the operation processing unit 34; a work name 312 given to each operation processing; work priority 313 assigned to each work processing; a required work display area 314 for defining the size of a display area required to display information resulting from each work processing; and display formats 315 determined to be adapted for respective display area ranges specified in the required work display area 314.

Next, a processing procedure in the display arrangement control unit 33 illustrated in FIG. 1 will be described with reference to flowcharts of FIGS. 4 and 5.

Figure 4:
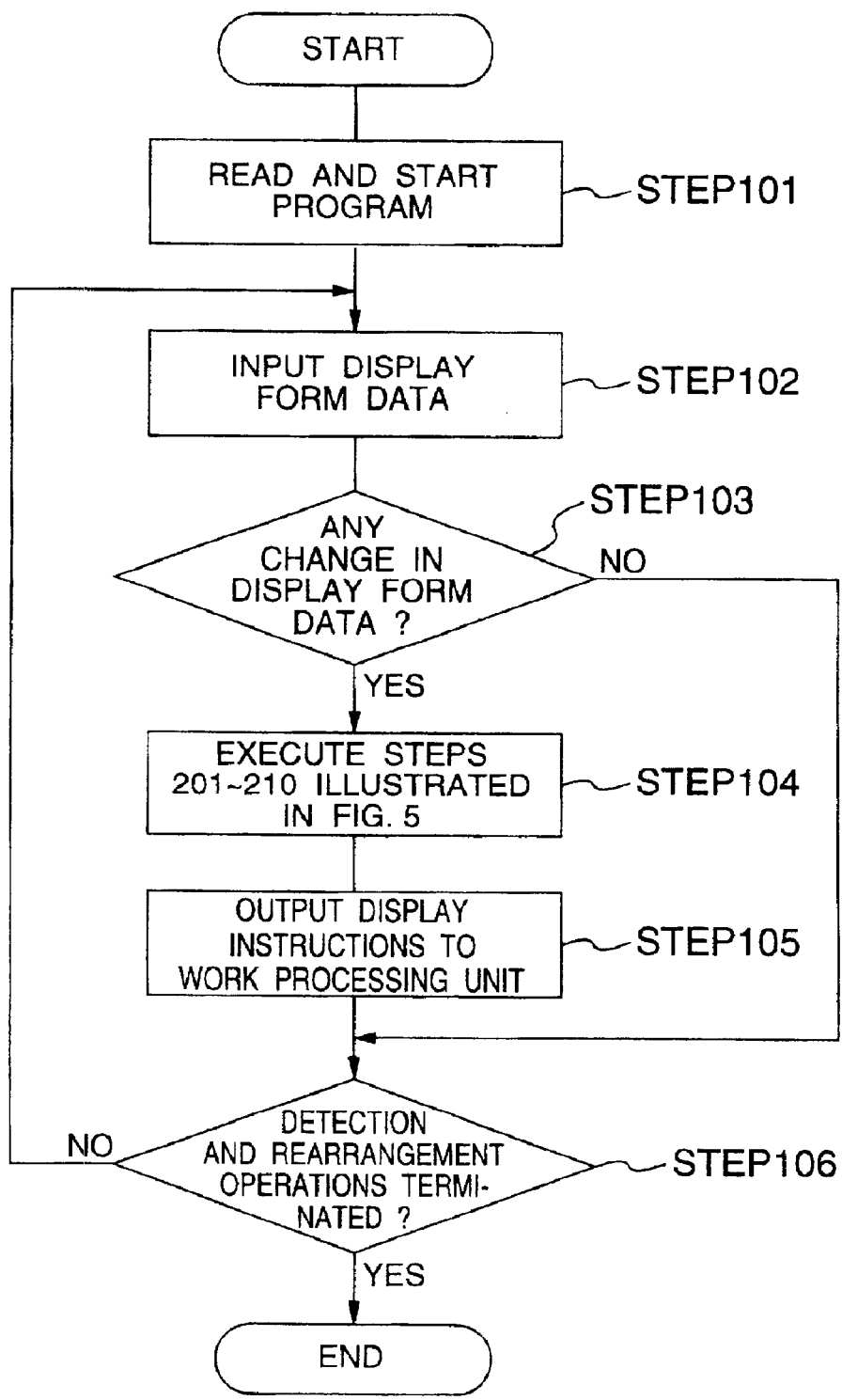
FIG. 4 is a flow chart illustrating a processing procedure in a display arrangement control unit according to each embodiment of the present invention.

First, at step 101 in FIG. 4, an arrangement control program is read and started for controlling a display arrangement in the display arrangement control unit 33. Next, at step 102, display form data including a resolution and so on of the display unit 4 detected by the display information detector unit 32 is inputted to the control unit 33. Then, at step 103, the control unit 33 determines whether or not the display form data including a detected resolution and so on has been changed as compared with previously set display form data for each of works scheduled to be executed. If no change is detected, the processing in the display arrangement control unit 33 is terminated at step 106.

Figure 5:
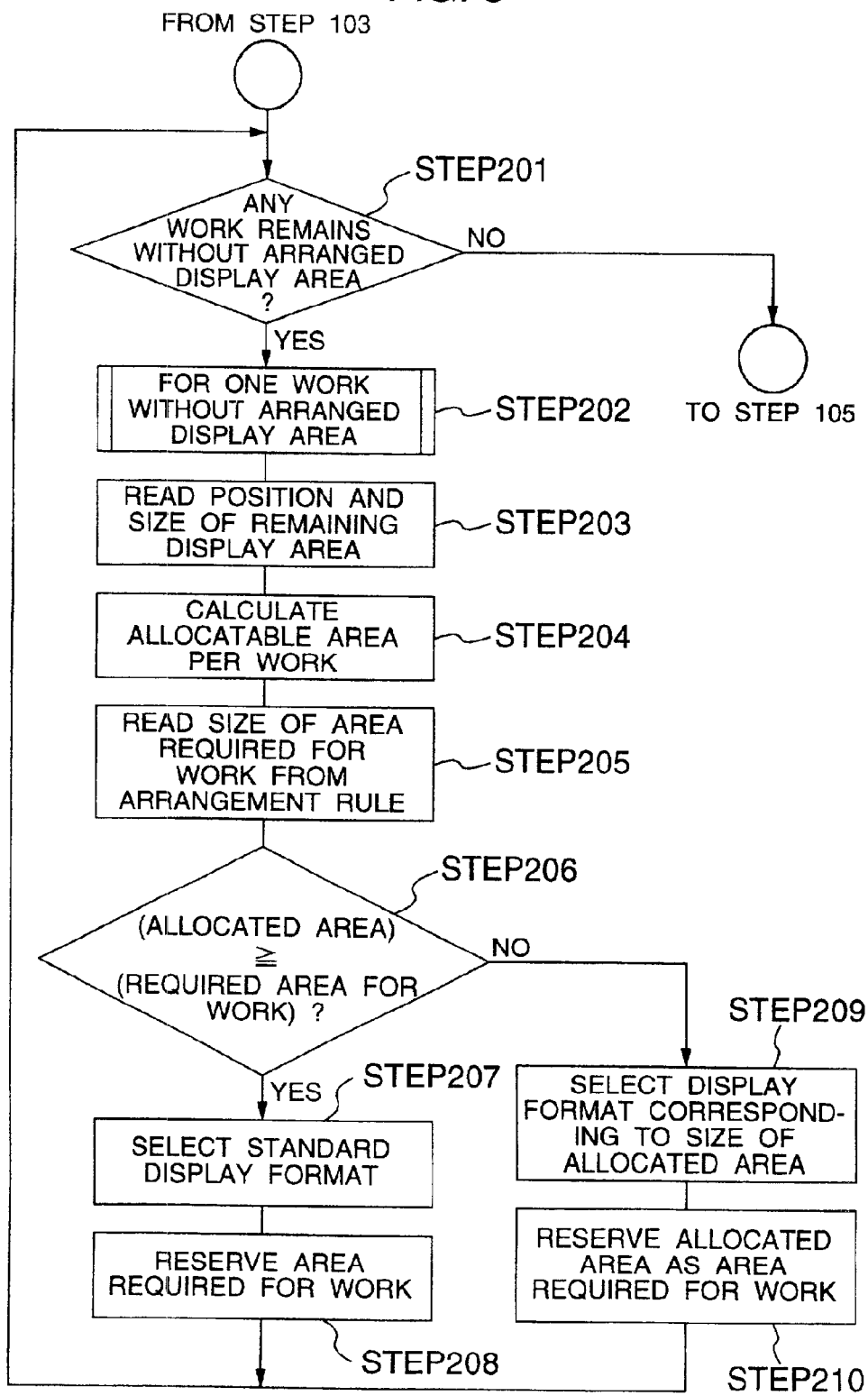
FIG. 5 is a flow chart illustrating a processing procedure in the display arrangement control unit according to the first embodiment of the present invention.

Conversely, if any change is detected at step 103, the processing at steps 201–210 illustrated in FIG. 5 is executed at step 104. At step 201, it is determined whether or not arrangement processing for defining display areas or the like associated with each work has been completed for the work. If completed, the processing procedure proceeds to step 105 illustrated in FIG. 4.

At step 201, if any work remains without its display area arranged, the processing procedure proceeds to step 202. At step 202, a work subjected to arrangement processing is selected from works, for which the arrangement of a display area has not been completed, with reference to the priority 313 of the respective works from the arrangement rule shown in FIG. 3 stored in the arrangement rule database 31. At step 203, the position and the size of an unallocated display area are read from the display form detector unit 32. Next, at step 204, the read unallocated display area is equally divided by the number of works scheduled to be displayed to derive an available display area (A) allocated to each work. Next, at step 205, the size of a display area (B) required for the work is read from the arrangement rule.

First, an initial value having the size of a display area required for display associated with the work is read from the required work display area 314 shown in FIG. 3. Then, at step 206, the allocatable display area (A) calculated at step 204 is compared with the area (B) read from the arrangement rule. If A≧B, a display format suitable for the area required to the work is selected from the display format 315 shown in FIG. 3 at step 207. Subsequently, at step 208, the read area is reserved as the area required for display. If A<B at step 206, a display format suitable to the area (A) allocated at that time is selected from the display format 315. Next, at step 210, the allocated area is reserved as an area required for display. If any work remains without its display area arranged, the processing is repeated from step 201.

Once a required display area and a display format corresponding thereto have been set for each work, the results are outputted to the work processing unit 34 as display arrangement instructions at step 105. The work processing unit 34 calculates sensor data read from sensor input unit 2 for each work, and controls a display form for displaying the calculation results in accordance with the display arrangement instructions sent from the display arrangement control unit 33.

As described above, according to this embodiment, when a display area required for display associated with each work is sufficiently ensured, a display format corresponding to the display area is selected to provide displays for four kinds of works in trend graph representation as illustrated in FIG. 2A. Conversely, if a display area required for display cannot be sufficiently ensured, a text display format is selected as illustrated in FIG. 2B. As a result, it is possible to avoid losing display information or overlapping of display information. In this way, according to this embodiment, a display format can be varied in accordance with a particular situation such that all information can be displayed without any loss in an appropriate form.

Next, a second embodiment of the present invention will be described with reference to FIG. 6.

Figure 6:
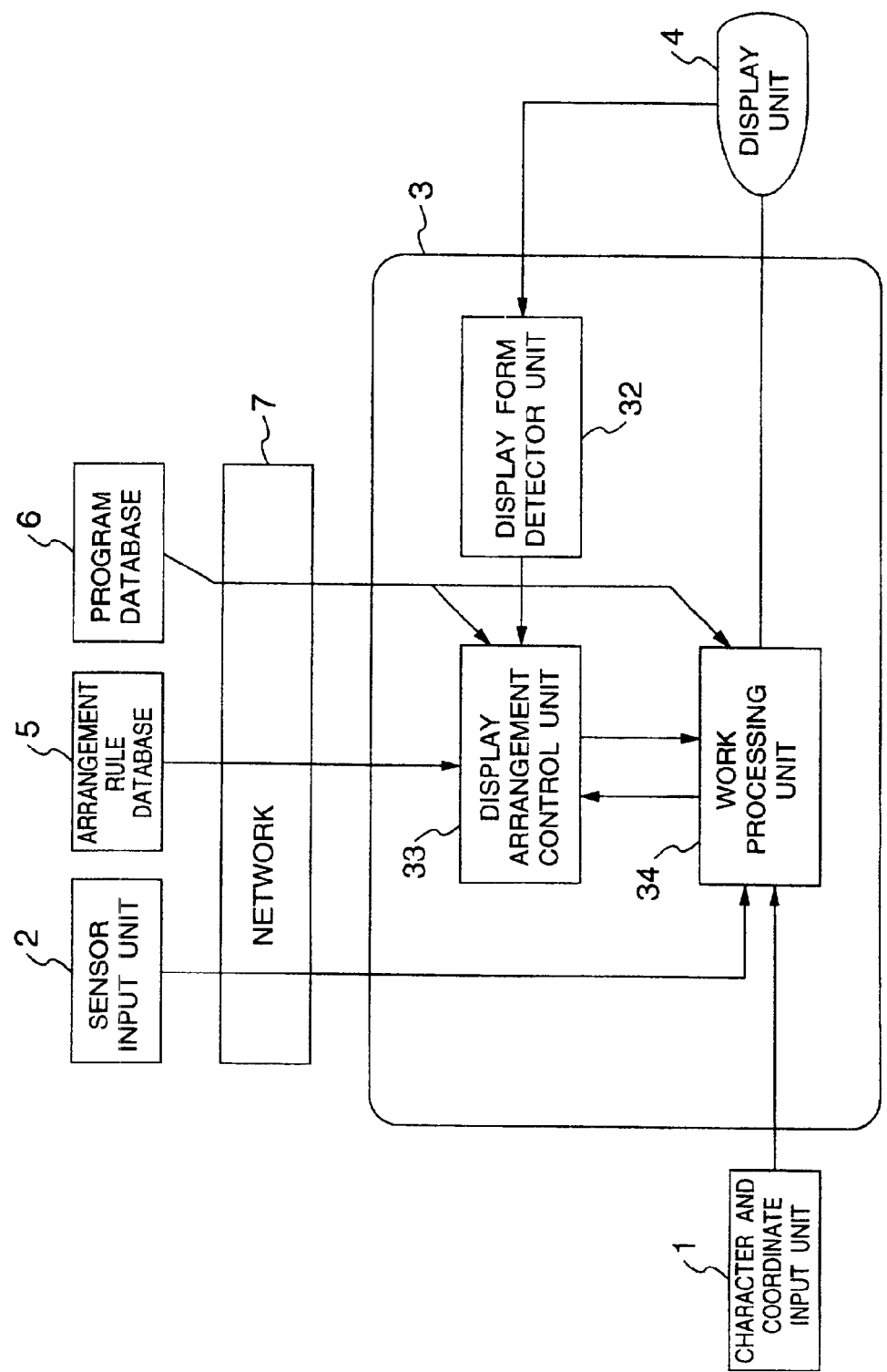
FIG. 6 is a block diagram illustrating an adaptive information display apparatus according to a second embodiment of the present invention.

FIG. 6 is a block diagram illustrating a general configuration of an adaptive information display apparatus according to the second embodiment.

The illustrated adaptive information display apparatus differs from the counterpart illustrated in FIG. 1 in that a variety of data and the like are received through a network.

Referring specifically to FIG. 6, the adaptive information display apparatus includes an arrangement rule database 5; a program database 6 for storing a variety of programs executed by a display arrangement control unit 33 and a work processing unit 34; and a network 7 for transmitting sensor data from sensor input units 2, data in an arrangement rule database 5, and a variety of data associated with processing programs from the program database 6 to a main body 3 of the adaptive information display apparatus. The remaining constituents are identical to those illustrated in FIG. 1, so that they are designated by the same reference numerals and the description thereon is omitted.

The adaptive information display apparatus of the second embodiment, which includes a portable apparatus, for example, having a function of wireless LAN connection, reads programs and an arrangement rule required for displaying information from the arrangement rule database 5 and the program database 6 provided separately from the adaptive information display apparatus through the network 7. Similarly, the adaptive information display apparatus reads sensor data from sensor input units 2 attached to respective devices in a plant or the like through the network 7. In this case, a plurality of adaptive information display apparatus may share the common sensor input units 2, arrangement rule database 5 and program database 6, and instruct them to perform the same operation. Also, even if respective adaptive information display apparatuses have display units 4 of different resolutions, their respective information can be displayed in accordance with the respective resolutions as illustrated in FIGS. 2A, 2B in a similar manner previously described in connection with the first embodiment.

Figure 8:
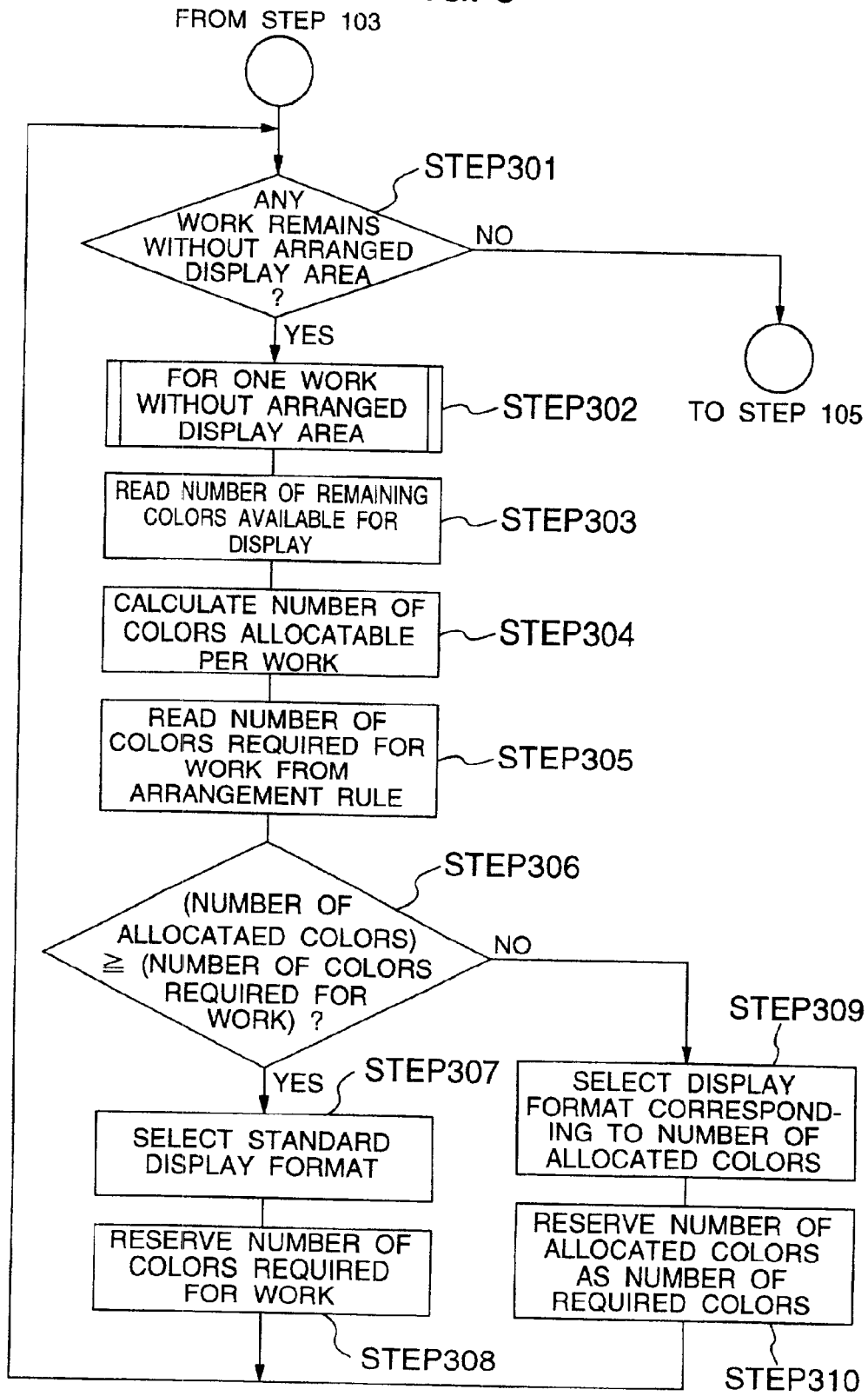
FIG. 8 is a flow chart illustrating a processing procedure in a display arrangement control unit according to the third embodiment of the present invention.

Next, a third embodiment will be described with reference to FIGS. 1, 7 and 8.

FIG. 7 shows another example of an arrangement rule stored in the arrangement rule database 31 or 5 illustrated in FIG. 1 or 6.

The arrangement rule shown in FIG. 7 differs from that shown in FIG. 3 in that the former is an arrangement rule for setting the number of display colors for each work while the latter is an arrangement rule for setting a display area for each work.

Generally, no problem will arise if a sufficient number of display colors are available in a display unit. However, if different colors are used for each work with a limited number of colors, an appropriate number of colors must be allocated to each work.

The arrangement rule of FIG. 7 includes a required work display color number 316 for setting the number of required colors for each work; and display formats 317 defined to be adapted for respective required work display color number ranges in the required work display color number 316. Since the remaining elements in the arrangement rule of FIG. 7 are identical to those shown in FIG. 3, they are designated the same reference numerals, and description thereon is omitted.

Next, a processing procedure in the display arrangement control unit 33 illustrated in FIG. 1 according to the third embodiment will be described with reference to a flow chart illustrated in FIG. 8.

While the third embodiment also includes steps related to the flowchart illustrated in FIG. 4, such steps have already been described, so that repetitive description thereon is omitted.

At step 301, if any work remains without its display area arranged, the processing procedure proceeds to step 302. At step 302, a work subjected to arrangement processing is selected from works, for which the arrangement of a display area has not been completed, with reference to the priority 313 of the respective works from the arrangement rule shown in FIG. 7. At step 303, the number of unallocated colors available to display is read from the display information detector unit 32. Next, at step 304, the read number of unallocated colors is equally divided by the number of remaining works scheduled to be displayed to calculate the number of available colors (C) allocated to each work. Then, at step 305, the number of colors (D) required for the work is read from the arrangement rule shown in FIG. 7. First, an initial value for the number of colors required for display associated with the work is read from the required work display color number 316 shown in FIG. 7. At step 306, the calculated number of allocated colors (C) is compared with the number of colors (D) read from the arrangement rule. If $C \geq D$, a display format suitable to the number of colors required for the work is selected from the display format 317 shown in FIG. 7 at step 307. Subsequently, at step 308, the read number of colors is reserved as the number of colors required for display. If C<D at step 306, a display format suitable for the number of colors (C) allocated at that time is selected from the display format 315 at step 309. Then, at step 310, the number of allocated colors is reserved as the number of required colors for display. If any work still remains without its display area arranged, the processing from step 301 is repeated.

Once the number of required display colors and a display format corresponding thereto have been set for each work, the results are outputted to the work processing unit 34 as display arrangement instructions at step 105 illustrated in FIG. 4.

As described above, according to the third embodiment, when a sufficient number of colors required for display is ensured for each work, a suitable display format is selected for the number of colors allocated to each work. Conversely, if a sufficient number of colors required for display cannot be ensured for each work, an appropriate number of colors are allocated so as to be adapted for the display of display information associated with each work, thus making it possible to appropriately allocate the number of display colors in accordance with a particular situation.

Next, a fourth embodiment of the present invention will be described with reference to FIGS. 1 and 9.

FIG. 9 shows another example of an arrangement rule stored in the arrangement rule database 31 or 5 illustrated in FIG. 1 or 7.

The arrangement rule shown in FIG. 9 differs from the arrangement rule shown in FIG. 3 in that the former is an arrangement rule for setting a drawing speed in each display area while the latter is an arrangement rule for setting a display area for each work. Generally, no problem will arise if an available drawing speed is extremely high. However, if the available drawing speed is not so high, an appropriate drawing speed must be set for each display area in order to prevent information to be displayed from missing.

The arrangement rule of FIG. 9 includes a required drawing speed 318; and display formats 319 in which suitable display forms are set for respective drawing speed ranges in the required drawing speed 318. Since the remaining elements in the arrangement rule of FIG. 9 are identical to those shown in FIG. 3, they are designated by the same reference numerals, and repetitive description thereon is omitted.

Next, the operation of the fourth embodiment will be described with reference again to the adaptive information display apparatus illustrated in FIG. 1.

The display arrangement control unit 33 reads a drawing speed for works, for which the arrangement of a display area has not been completed, from the display form detector unit 32, and the read unallocated drawing speed is equally divided by the number of remaining works scheduled to be displayed to calculate an available drawing speed (E) allocated to each work. Then, a drawing speed (F) required for the work is read from the arrangement rule shown in FIG. 9. An initial value for a drawing speed required for display associated with the work is first read from the required drawing speed 318 shown in FIG. 9. Further, the display arrangement control unit 33 compares the two drawing speeds. If $E \geq F$, a display format suitable for the drawing speed required for the work is selected from the display format 319 shown in FIG. 9. If E<F, a display format suitable for the drawing speed (E) allocated at that time is similarly selected from the display format 319.

While the fourth embodiment defines the arrangement rule for a display format suitable for a required drawing speed for each work in FIG. 9, a display format may be selected in combination of a plurality of arrangement rules, as illustrated in FIG. 10.

In this case, as illustrated in FIG. 10, the structure of the arrangement rule is extended to select a display format from a plurality of conditions. Specifically, a matrix of display formats 322 are formed, with a required work display area 320 and a required work drawing speed 321 used as display format selecting conditions, and the required work display area 320 and the required work drawing speed 321 are determined one by one in accordance with a processing procedure similar to those illustrated in FIGS. 4 and 5 to permit a selection of a display format 322 suitable for respective conditions from the matrix.

Next, several other embodiments will be described below.

While in the fourth embodiment, the display arrangement control unit 33 illustrated in FIG. 1 or 7 detects a drawing speed from the display form detector unit 32 for selecting an appropriate display format, a similar selection of a display format may be achieved by detection of a computation speed in the work processing unit 34.

Specifically, in the adaptive information display apparatus illustrated in FIG. 1 or 7, the display arrangement control unit 33 acquires a computation speed from the work processing unit 34 to calculate an allocated computation speed (G) for a work. Then, an initial value for a computation speed (H) required for the work is read from an arrangement rule, not shown, stored in the arrangement rule database 31 or 5 and compared with the allocated computation speed (G). If $G \geq H$, the initial value for the computation speed (H) is reserved, and a display format corresponding thereto is selected from the arrangement rule. If $G<H$, the allocated computation speed (G) from the work processing unit 34 is reserved, and a display format corresponding thereto is selected from the arrangement rule.

As a yet another embodiment, similar processing may be performed based on the number of works under processing in the work processing unit 34 illustrated in FIG. 1 or 7. In this case, an initial value for the number of works is read from an arrangement rule, not shown, stored in the arrangement rule database 31 or 5 to select a display format by similar processing to that used when a display format is selected in accordance with a computation speed.

As a still another embodiment, similar processing to the foregoing may be performed based on a processing load caused by each of works under processing in the work processing unit 34 illustrated in FIG. 1 or 7. In this case, a display format corresponding to a work load from the work processing unit 34 is selected from an arrangement rule, not shown, stored in the arrangement rule database 31 or 5.

As a further embodiment, similar processing to the foregoing may be performed based on the work priority of works under processing in the work processing unit 34 illustrated in FIG. 1 or 7. In this case, the priority level of a work under processing in the work processing unit 34 is read and compared with the priority level of a work to be processed presently. If the priority level of the work under processing is equal to or lower than the priority level of the work to be processed presently, a display format corresponding to the lower priority level of the work under processing is selected from an arrangement rule, not shown, stored in the arrangement rule database 31 or 5, while a display format corresponding to an initial value for the priority level of the work to be processed presently is selected from the arrangement rule. Conversely, if higher, the display format for the work under processing is not changed, while a display format corresponding to the lower priority level of the work to be processed presently is selected from the arrangement rule.

As a further embodiment, the information display apparatus may be configured such that sensor data, characters and coordinate data are inputted, and a plurality of kinds of work processing are executed based on the respective inputted data to display the execution results on the display unit. A detector unit is provided for detecting a display form of the information display unit itself, so that the respective inputted data is converted by a converter unit in accordance with a display form detected by this detector unit, and the converted data is outputted to the display unit, thereby making it possible to output data in consideration of display capabilities of the information display apparatus itself. The display form used in this embodiment refers to the processing capabilities of the information display apparatus itself which may include, for example, a resolution, the number of display colors and a drawing speed of the display unit, a computation speed, the number of works under processing, work loads, work priority and so on in the work processing unit, the performance of the processor used in the information display apparatus, a display area of the display unit, and so on. It is contemplated that a certain threshold value may be specified for a particular capability of the information display apparatus such that input data is converted and outputted by determining whether the capability of the information display apparatus is below or above the threshold value. It is contemplated, for example, that if respective inputted data are analog data, and a resolution or a display area of the display unit of the information display apparatus is detected to be below a certain threshold value, the inputted analog data are converted to digital data which are then delivered to an output unit.

In the adaptive information display apparatus according to the respective embodiments described above, the configuration for processing display form information based on data from a variety of data input units and the display form data detector unit of the display unit may be implemented in software as well as in hardware. For example, processing procedures illustrated in FIG. 4 and so on for the display control unit 33, the work processing unit 34 and so on within the main body 3 of the information display apparatus may be realized by software programs executed by a CPU. In addition, such programs may be supplied from a server to a memory of the adaptive information display apparatus, or alternatively may be loaded from a recording medium such as a floppy disk, a memory card or the like.

Thus, according to the foregoing embodiment, a display format for information to be displayed may be selected in accordance with a variety of data related to a display form including a resolution, the number of display colors and a drawing speed of the display unit, a computation speed, the number of works under processing, work loads and work priority in the work processing unit, and so on, thereby making it possible to fully display all information without any loss, even if an adaptive information display apparatus having different specifications is used.

As described above, according to the adaptive information display apparatus of the present invention, a display format for information to be displayed can be selected in accordance with display form data such as a resolution of the display unit and so on, so that an appropriate display form can be selected to display information in accordance with a variety of conditions related to the display, including the display capabilities of the information display apparatus, priority of information to be displayed, the number of information to be displayed, and so on.

What is claimed is:

1. An information display apparatus including a sensor input unit inputting sensor data, a character and coordinate input unit for inputting characters and coordinates, a work processing unit executing a plurality of kinds of work processing and outputting results of the work processing based on the sensor data input from the work processing unit and selection of information to be displayed on a display screen by said character and coordinate input unit as screen displaying information, and a display unit having the display screen and displaying the screen displaying information which is the result of the plurality of kinds of work processing output from said work processing unit, said information display apparatus comprising:

a representation mode detector unit detecting representation mode data of information displayed on said display screen, and detecting a current status of the display unit, the current status including at least one of an area available for display, a number of colors allocatable for display and a drawing speed;

arrangement rule storing means for storing an arrangement rule defining an optimal representation mode corresponding to each of said plurality of kinds of work processing with respect to the current status of the display unit; and a display arrangement rule control unit coupled to said representation mode detector unit and said arrangement rule storing means and comparing the current status of the display unit with the arrangement rules stored in said arrangement rule storing means for each work processing to output a matched representation mode to the display unit, and in response to the output from said display arrangement control unit, said work processing unit outputting information display instructions of a representation mode in accordance with said matched representation mode to said display unit.

2. An information display apparatus according to claim 1, wherein said representation mode data detected in said representation mode detector unit is a display resolution, and the arrangement rule stored in said arrangement rule storing means comprises display areas set in accordance with the display resolution and display formats.

3. An information display apparatus according to claim 1, wherein said representation mode data detected in said representation mode detector unit is the number of display colors, and the arrangement rule stored in said arrangement rule storing means comprises the number of display colors and display formats.

4. An information display apparatus according to claim 1, wherein said representation mode data detected in said representation mode detector unit is a drawing speed, and the arrangement rule stored in said arrangement rule storing means comprises drawing speeds and display formats.

5. An information display apparatus comprising a sensor input unit for inputting sensor data, a character and coordinate input unit for inputting characters and/or coordinates, a work processing unit for executing a plurality of kinds of work processing and outputting results of the work processing based on the sensor data input from said sensor input unit and said character and coordinate input unit, and a display unit having a display screen for displaying the screen displaying information which is the results of the plurality of kinds of work processing output from said work processing unit, said information display apparatus further comprising:

arrangement rule storing means for storing an arrangement rule defining an optimal representation mode corresponding to each of said plurality of kinds of work processing with respect to a current status of the display unit, the current status including at least one of an area available for display, a number of colors allocatable for display and a drawing speed; and a display arrangement rule control unit for comparing the current status of the display unit with the arrangement rule stored in said arrangement rule storing means for each work to output a matched display arrangement rule, and in response to the output from said display arrangement control unit, said work processing unit outputting information display instructions of a representation mode in accordance with said matched display arrangement rule to said display unit.

6. An information display apparatus according to claim 5, wherein said work processing data detected in said work processing unit is a computation speed, and the arrangement rule stored in said arrangement rule storing means comprises computation speeds and display formats.

7. An information display apparatus according to claim 5, wherein said work processing data detected in said work processing unit is the number or works, and the arrangement rule stored in said arrangement rule storing means comprises the number of works and display formats.

8. An information display apparatus according to claim 5, wherein said work processing data detected in said work processing unit is a work load, and the arrangement rule stored in said arrangement rule storing means comprises work loads and display formats.

9. An information display apparatus according to claim 5, wherein said work processing data detected in said work processing unit is work priority, and the arrangement rule stored in said arrangement rule storing means comprises work priority levels and display formats.

10. A method of operating an information display apparatus comprising a sensor input unit inputting sensor data, a character and coordinate input unit inputting characters and coordinates, a work processing unit executing a plurality of kinds of work processing and outputting results of the work processing based on respective data input from said sensor input unit and said character and coordinate input unit, and a display unit displaying the results of the plurality of kinds of work processing output from said work processing unit, comprising the steps of:

detecting display form data for a said display unit by a display form detector unit, the display form data including at least one of an area available for display, a number of colors allocatable for display, and a drawing speed;

storing arrangement rule defining display forms corresponding to each of said plurality of kinds of work processing with respect to the current status of the display unit in a storage unit;

comparing the current status of the display unit with the arrangement rule stored in said storage unit for each work processing by a display arrangement control unit to output a predetermined display arrangement instruction; and outputting the result of each of said plurality of kinds of work processing in a predetermined display form in accordance with said display arrangement instruction in said work processing unit.

11. A computer-readable recording medium for storing a program for causing a computer to operate an information display apparatus comprising a sensor input unit inputting sensor data, a character/coordinate input unit inputting characters and coordinates, a work processing unit executing a plurality of kinds of work processing and outputting results of the work processing based on respective data input from said sensor input unit and said character/coordinate input unit, and a display unit displaying the results of the plurality of kinds of work processing output from said work processing unit, said program comprising:

program means for causing said computer to detect display form data for said display unit, the display form data including at least one of an area available for display, a number of colors allocatable for display, and a drawing speed;

program means for causing said computer to store an arrangement rule defining display forms corresponding to each of said plurality of kinds of work processing with respect to the current status of the display unit;

program means for causing said computer to compare the current status of the display unit with said stored arrangement rule for each work processing to output a predetermined display arrangement instruction; and program means for causing said computer functioning as said work processing unit to output the result of each of said plurality of kinds work processing in a predetermined display form in accordance with said display arrangement instruction.

* * * * *

UNITED STATES PATENT AND TRADEMARK OFFICE
CERTIFICATE OF CORRECTION

PATENT NO. : 6,873,345 B2
DATED : March 29, 2005
INVENTOR(S) : Fukuda, Yoshibumi It is certified that error appears in the above-identified patent and that said Letters Patent is hereby corrected as shown below:

Title page,
Insert Item:
-- [30] Foreign Application Priority Data
   April 24, 1997 (JP)     9-107501 --.

Signed and Sealed this

Thirtieth Day of August, 2005

JON W. DUDAS
*Director of the United States Patent and Trademark Office*